United States Patent
Stevenson

(10) Patent No.: US 7,409,226 B1
(45) Date of Patent: Aug. 5, 2008

(54) USE OF DOPPLER DIRECTION FINDING TO IMPROVE SIGNAL LINK PERFORMANCE IN A WIRELESS COMMUNICATION ENVIRONMENT

(75) Inventor: Carl R. Stevenson, Macungie, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/473,650

(22) Filed: Dec. 29, 1999

(51) Int. Cl.
*H04M 1/00* (2006.01)

(52) U.S. Cl. .................. 455/562.1; 455/456.1; 342/417; 342/418; 342/423

(58) Field of Classification Search .................. 455/562, 455/67.6, 154.1, 161.1, 272, 275, 276.1, 455/277.1, 269, 205, 226.1, 227–229, 562.1, 455/67.16, 404.1, 456.1; 342/357.05, 368, 342/371–372, 417–418, 422–423, 428, 432–434, 342/436–437, 442, 443, 445
See application file for complete search history.

(56) References Cited

U.S. PATENT DOCUMENTS

| | | | | | |
|---|---|---|---|---|---|
| 5,303,240 | A | * | 4/1994 | Borras et al. ................. | 455/562 |
| 5,343,211 | A | * | 8/1994 | Kott ............................. | 342/379 |
| 5,592,180 | A | * | 1/1997 | Yokev et al. ................. | 342/450 |
| 5,701,583 | A | * | 12/1997 | Harbin et al. ................. | 455/25 |
| 5,940,033 | A | * | 8/1999 | Locher et al. ................ | 342/378 |
| 6,005,516 | A | * | 12/1999 | Reudink et al. .............. | 342/375 |
| 6,148,195 | A | * | 11/2000 | Schuchman et al. .......... | 455/424 |
| 6,150,987 | A | * | 11/2000 | Sole et al. .................... | 455/525 |
| 6,178,333 | B1 | * | 1/2001 | Feuerstein et al. ........... | 455/503 |
| 6,271,791 | B1 | * | 8/2001 | Bruzzone ..................... | 342/422 |
| 6,489,923 | B1 | * | 12/2002 | Bevan et al. ................. | 455/456 |

* cited by examiner

*Primary Examiner*—Duc Nguyen
*Assistant Examiner*—Anthony S Addy

(57) ABSTRACT

A rotating antenna is used in a wireless system to impart a phase onto a received signal by electronically moving the effective receiving antenna location along a circular path such that the modulation phase angle indicates the bearing of the radio transmission and the gain of a signal transmitted by the antenna is increased in the direction of the received signal to enhance the link between transmitter and receiver. In order to simulate a rotating antenna, the antenna preferably comprises an antenna array having a plurality of antennae for use by one receiver. During reception of a signal from a remote transmitter, a scanner is adapted to scan through the plurality of antennae and in turn provide a signal received from each of the plurality of antennae to the receiver in the wireless system. The signal is modulated by virtue of the antenna rotation to include a Doppler frequency component. Determination of this frequency component enables a receiver to determine the bearing of a received signal and allows the receiver antenna to simulate a highly directional antenna in a transmit mode by operation of the antenna array as a phased array with increased gain in the direction of the received signal.

21 Claims, 3 Drawing Sheets

USE OF DOPPLER DIRECTION FINDING TO IMPROVE SIGNAL LINK PERFORMANCE IN A WIRELESS COMMUNICATION ENVIRONMENT

BACKGROUND OF THE INVENTION

1. Field of the Invention

The present invention relates generally to improved techniques for communication in a wireless environment, and, more particularly, to a communication system using Doppler direction finding techniques to enhance signal link performance between a transmitter and a receiver in a wireless communication system by using a scanned antenna array to determine the bearing of a received signal using the Doppler frequency shift principle and increasing the gain of the antenna in the direction of the received signal during a transmit mode to improve the performance of a given communication link.

2. Background of Related Art

Conventional wireless systems utilize various adaptive signal processing techniques as well as antenna diversity to compensate for channel-induced distortion, such as multipath propagation errors and the resulting delay spread caused by reflectors of various types in the path of a received signal.

While these technologies are used in wireless telephony systems as well as stationary wireless applications employing voice or data communications, such as wireless Local Area Networks (LANs), cordless telephone systems, and other applications which are stationary or quasi-stationary in nature (i.e., those involving no movement or relatively slow movement between communicating units), stationary applications possess unique characteristics due to the absence of a dynamically changing environment.

In a conventional antenna diversity scheme, such as that illustrated in FIG. 2, signals are received by a plurality of antennae connected to a receiver. In particular, a receiver 200 selects by means of a switch 202 one of the plural antennae 204, 206 for reception of a signal transmitted by an antenna 208 of a remote transmitter 210 based upon evaluation of received signal quality such as signal strength, bit error rate, and the like. In a typical wireless environment, the signal path corresponding to each antenna 204, 206 has different multipath fading characteristics, and thus the selection of a respective antenna affects the quality of the reception of the relevant signal.

The cellular channel is subject to various types of distortion which can randomly alter the carrier frequency of a received signal as well as the message content of the signal.

Such distortion includes delay spread due to multipath fading, the Doppler effect, flat and frequency-selective fading, additive noise, and the like, all of which combine to degrade the quality of a received signal. Thus, a process such as adaptive equalization, by which the characteristics of a fading channel are adaptively determined, is needed to accurately extract information from the time-dispersive channel. To estimate and compensate for channel-induced distortion, wireless communication systems typically utilize adaptive channel characterization techniques which predict channel response based upon the transmission of known data (e.g., a so-called training sequence or pilot signal). As is well known in the art, however, such processes are themselves sensitive to significant distortion, including frequency offset, which may cause the channel to vary beyond the rate at which the adaptive processes can adapt.

In addition, with the introduction of more optimal modulation schemes, relatively precise frequency estimates are often needed. Frequency errors may arise, for example, from the transmitter/receiver clock not being perfectly locked due to inaccuracies or drift in the crystal oscillator, as well as from large frequency shifts due to the Doppler effect, such as those occurring from vehicles moving at high speeds in open spaces. Many wireless systems allow only a small amount of time for achieving initial signal acquisition and require a minimum tracking error after initial acquisition. Typical AFC or PLL circuits are not generally able to lock on or track the received signal with a reasonable degree of accuracy.

Many systems employ a so-called pilot signal or training sequence to provide adequate reception. For example, an improved system employing a pilot signal has been disclosed by the present inventor in U.S. Pat. No. 4,726,069 ("the '069 patent"). The system disclosed by the '069 patent provides improved signal reception in a wireless mobile environment by injecting a pilot tone in a transmitted signal so that a receiver having knowledge of the characteristics of the pilot tone can correct the received signal. In particular, the '069 patent discloses a system employing "feed forward signal regeneration" to avoid undesirable effects due to distortion such as multipath channel propagation. Like the system of FIG. 2, the system disclosed in the '069 patent contains an intervening multipath environment consisting of multiple reflectors, resulting in multiple received signals at each antenna with varying delays due to multipath propagation. As described in detail in the '069 patent, which is explicitly incorporated herein by reference, the receiver 400 incorporates techniques which allow it to continuously characterize and correct for amplitude and phase distortions imposed on the received signal, and is typically optimized for operation in a mobile environment. In particular, the receiver described in the '069 patent involves, in part, the use of a transmitter architecture based on I/Q modulator techniques (including and similar to what is known in the art as a "Weaver modulator" architecture). The transmitter facilitates the generation of a transmitted signal structure incorporating a re-inserted carrier at or about the channel center frequency. The re-inserted carrier is inserted at a controlled level to serve as a pilot signal, and can be recovered and processed by the receiver. The re-inserted carrier frequency permits characterization of both phase and amplitude impairments imposed on the received signal.

Applicants' co-pending application Ser. No. 09/204,303 discloses further improvements to systems having anti-multipath impairment capabilities, such as those disclosed in the '069 patent, which improve the effectiveness of such systems in stationary or quasi-stationary environments. In applicant's co-pending application, a scanned antenna array is introduced into a stationary wireless communications system, for example, to generate a more dynamic multipath environment. By simulating a more dynamic multipath environment, multipath channel impairments can be reduced or eliminated by a receiver, e.g., according to the 069 patent, optimized for a mobile environment and having anti-multipath impairment capabilities. This permits the receiver to derive correction terms and correct for the multipath impairments in accordance with its normal operation.

While the use of a pilot signal or training sequence, as in the '069 patent, facilitates the effective elimination of many types of channel distortion encountered in wireless communication environments, such as multipath propagation errors, frequency and sample timing offsets, Doppler spread, and the like, such techniques lose their effectiveness in environments where a received signal is so severely degraded that the pilot signal cannot be detected. For example, in stationary or quasi-stationary environments (e.g., wireless LAN systems and cordless telephones) where the dynamics of the fading channel may render a received signal temporarily indistinguishable, the use of pilot signals, training sequences, and adaptive channel characterization techniques are often insufficient to render a signal detectable. In such environments, signal degradation may be so severe that detection of the information content of a received signal is impossible using conventional signal processing techniques and antenna diversity. Although the system disclosed in applicant's co-pending patent application Ser. No. 09/204,303 increases the ability of a receiver having anti-multipath impairment capabilities to derive correction terms in a substantially stationary environment, such a system may not, by itself, enhance reception of severely degraded signals in many cases.

For instance, in stationary or quasi-stationary applications, it is not uncommon for an antenna assembly to be positioned in a deep null for extended time periods during which adequate signal reception is not possible despite the use of antenna diversity techniques. Even in mobile applications with relatively slow motion relative to the wavelength of the carrier frequency and the signaling intervals in use, it is possible for the antenna of a receiver to be positioned in a deep null in the quasi-stationary interference pattern created by the multipath propagation environment. It is also possible that the receiver antenna might be located at stationary or quasi-stationary locations where the vector sum of the multipath reflections will add destructively at the receiver antenna, producing a deep fade in signal strength. It is also quite possible that the fade in signal strength may exceed that allowed by the system link budget. This adversely affects performance of the receiver, especially at what would be normal AWGN channel range limits where the signal is relatively weak even at the maximum in the interference pattern, and may even cause loss of a communications link.

In a mobile communications environment, the foregoing circumstance may be rectified by simply relocating a mobile transceiver to a position at which signal reception is improved so that conventional techniques, such as those employing pilot signals or training sequences, adaptive equalization, and the like, will be effective. These techniques provide sufficient signal quality in quasi-stationary or time-varying fading environments, and tend to fail only in rapidly-changing fading environments where the fading rates exceed the bandwidth of the feedback loops involved in the channel estimation and compensation processes.

However, such conventional techniques, including the feed forward signal regeneration technique disclosed in the 069 patent, can fail to produce acceptable results unless a mobile unit is initially located or moved to a position outside a deep fade, thereby requiring the subscriber to physically move a mobile unit to a location at which signal reception is adequate.

Moreover, in many stationary applications, it is substantially more inconvenient to move a receiver antenna, which may be permanently mounted or otherwise out of reach.

Thus, while stationary or slowly changing multipath fading environments have typically been countered through the use of adaptive equalization techniques involving estimation and feedback and/or through the use of antenna diversity techniques, these conventional techniques are often ineffective to enhance signal reception of severely degraded signals. There is thus a need for an improved method and apparatus which is effective to reduce or eliminate channel impairments in a wide variety of fading environments, including stationary, quasi-stationary applications (e.g., having movement of reflecting objects such as people moving therebetween) and mobile environments.

SUMMARY OF THE INVENTION

In accordance with the principles of the present invention, a rotating antenna or scanned antenna array is used in a wireless system to impart a phase modulation onto a received signal by electronically moving the effective receiving antenna location along a circular path such that the modulation phase angle of the received signal can be processed to determine the origin of the radio transmission.

Preferably, the present invention uses an antenna array which is scanned during a receive mode to impart a Doppler modulation onto a received signal. The antenna array simulates a rotating antenna and preferably comprises an antenna array having a plurality of antennae for use by one receiver. During reception of a signal from a remote transmitter, a scanner is adapted to scan through the plurality of antennae and in turn provide a signal received from each of the plurality of antennae to the receiver in the wireless system. The signal is modulated by virtue of the effective antenna rotation to include a Doppler frequency component. Processing of this component according to well known Doppler direction finding techniques enables a receiver to determine the bearing of a received signal. During transmission of a signal from the antenna array to the remote receiver, the antenna array is preferably operated as a phased array with increased gain in the direction of the intended receiver. Thus, the antenna serves as a highly directional antenna in the transmit mode and is effective to function outside the range of conventional antennas.

BRIEF DESCRIPTION OF THE DRAWINGS

The above-described and other objects, features and advantages of the present invention will become apparent to those skilled in the art from the following description with reference to the appended drawings, in which.

DETAILED DESCRIPTION OF THE ILLUSTRATIVE EMBODIMENTS

As described above, applicant's co-pending application Ser. No. 09/204,303 introduces a scanned antenna array into a wireless communication system which may be stationary or include relatively slow motion between the transmitter and receiver, e.g., by persons or other objects moving between the transmitter and receiver. By introducing an element which simulates a mobile environment, multipath channel impairments can be reduced or eliminated by a receiver, e.g., according to the 069 patent, optimized for a mobile environment and having anti-multipath impairment capabilities. This proves to be of substantial benefit in stationery or quasi-stationary environments.

The present invention utilizes a similar scanned antenna array for the additional purpose of determining the bearing of a received signal to improve return link signal performance, and has significant application to both stationary and mobile environments. In a stationary or quasi-stationary environment, as in applicant's above-identified co-pending application, use of a scanned antenna array on a receiver of a stationary unit enables the receiver to determine the bearing of a received signal, which facilitates an improved link between the receiver and a remote transceiver. This improvement is facilitated by operation of the antenna array on transmit as a phased array with increased gain in the direction of the received signal. Use of a scanned antenna array in a base station of a mobile communication system facilitates the same advantage and others which will be described below.

Figure 1:
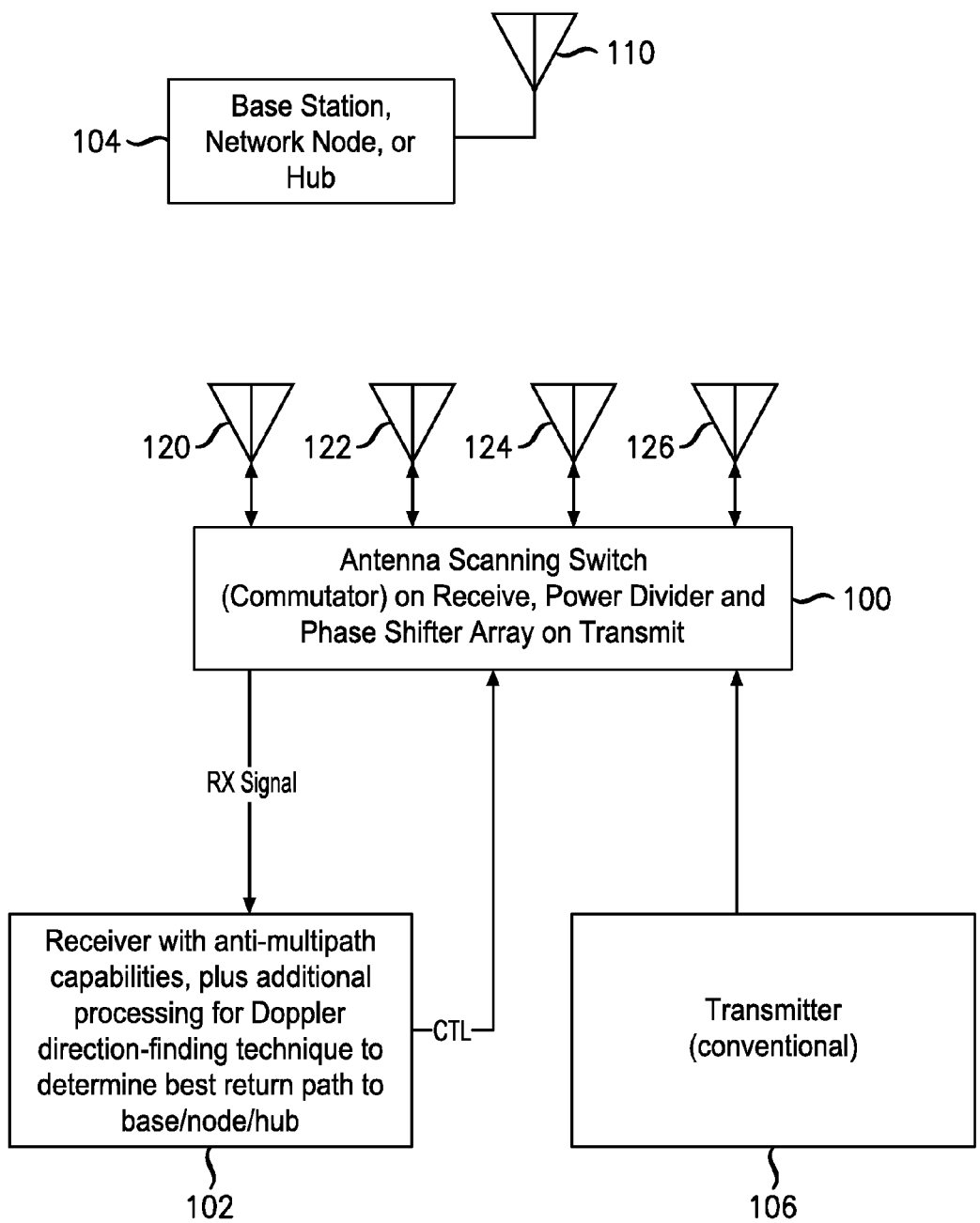
FIG. 1 shows a wireless communication system in which the present invention may be practiced.
Figure 2:
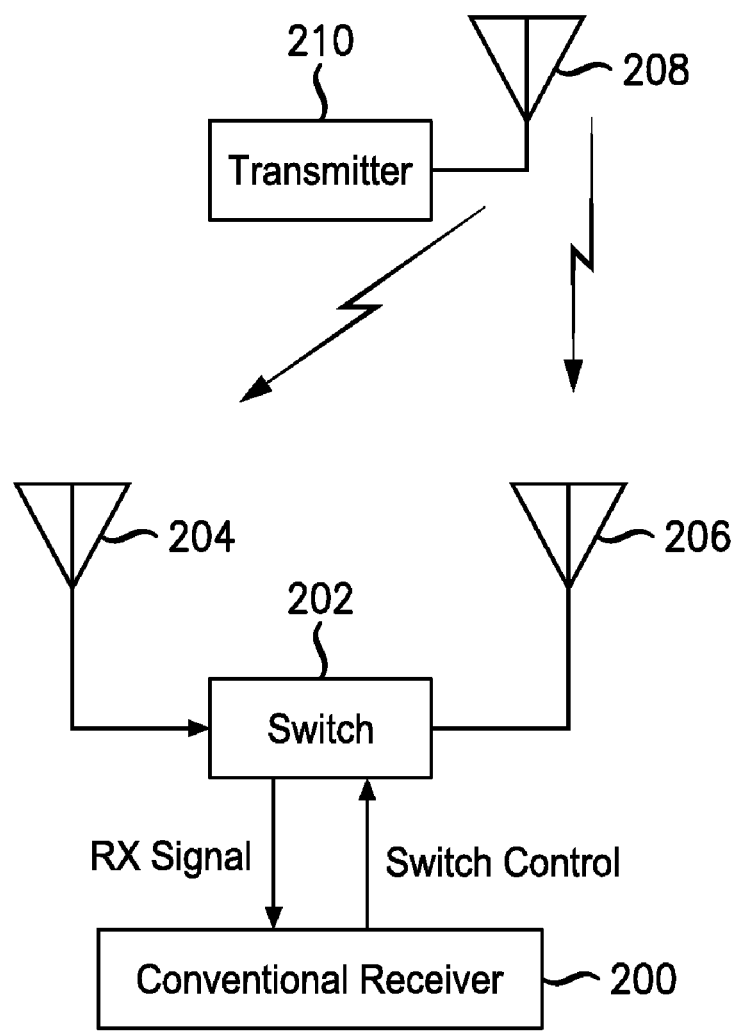
FIG. 2 shows a conventional antenna diversity scheme.

A preferred embodiment of the present invention is illustrated in FIG. 1, and, much like the system illustrated in applicant's above-identified co-pending application, utilizes a feed forward method of combating fading over a wide range of fading dynamics by including a scanned antenna array.

As in applicant's co-pending application, FIG. 1 shows a stationary or quasi-stationary application in which a mobile environment is simulated, e.g., using an electronically scanned antenna array essentially in replacement of the single antenna or antenna diversity scheme as described above. Although shown in the illustrative embodiment as a stationary environment utilizing the scanned antenna array to produce more dynamic multipath propagation errors which may then be combatted by the receiver, the antenna array may also be employed in a mobile environment. In combination with the scanned antenna array is a receiver 102 which is optimized for a mobile environment, e.g., having anti-multipath impairment capabilities, which reduces or even eliminates multipath channel impairments. As will be appreciated by those of ordinary skill in the art, the receiver 102 may comprise any suitable receiver and is not limited to the receiver disclosed in the '069 patent.

In particular, in FIG. 1, a scanned antenna array comprises a plurality of antennae 120-126 and a suitable electronic scanner 100 to simulate rotational movement about a virtual antenna center in the system. The simulated rotational movement increases the fading dynamics of the received signal, thus enabling a receiver 102, e.g., according to the 069 patent, to correct for the multipath impairments. The plurality of receiver antennae 120-126 are scanned by the scanner 100, e.g., in sequence, to receive in turn a signal transmitted by an antenna 110 of a remote transmitter 104.

Simulation of a mobile environment created by scanning a plurality of antennae 120-126 results in amplitude and phase modulation of the received signal, and a Doppler spread of the received signal, each in a manner related to the carrier frequency and the scan rate, which are chosen based on the particular application. In accordance with one aspect of the invention, the receiver 102 is a receiver intended for mobile applications, e.g., such as described in the 069 patent, but further including the scanned antenna array to simulate a mobile environment to permit the receiver to reduce or eliminate multipath channel impairments, in accordance with the principles of the present invention. The receiver includes anti-multipath impairment capabilities, e.g., as shown and described in the '069 patent by the same inventor.

In a receive mode, the scanner 100 effectively moves the receiver's 102 antenna rapidly through the multipath environment, even though it is physically stationary (or moving slowly, e.g., at pedestrian speeds). The scan rate of the scanner 100 shown in FIG. 1 can be selected in conjunction with modulation type, symbol rate, and coding techniques for any given application to facilitate the recovery of the (now varying) fading characteristics imposed on the received signal and its pilot by the motion. This permits the receiver according to the presently described embodiment to derive correction terms and correct for the multipath impairments in accordance with its normal operation, delivering the best possible performance based on placement of the receiver.

The scan rate may be a relatively low rate, e.g., in the 100 to 200 Hertz range, or well into the Kilohertz range, e.g., 2 to 3 KHz or more. Of course, the principles of the present invention relate equally to scan rates which are lower than 100 Hz or higher than 3 KHz.

As described in applicant's above-identified co-pending application, the scanner 100 causes the creation of a "virtual antenna" which moves through the multipath environment, preferably at a constant speed. This will impose amplitude and phase perturbations on the received signal (as seen by receiver 102) similar to those which occur when a single antenna moves through the quasi-stationary interference pattern of the mobile multipath environment. Accordingly, advantages and technologies available for use in a mobile environment can be made available for suitable use in a stationary or quasi-stationary environment as well.

The artificially-induced increase in the dynamics of the multipath environment (as seen by the receiver 102) permits the receiver 102 to combat multipath fades effectively in a dynamic fashion, even though stationary or moving very slowly.

Although not shown in FIG. 1, the intervening environment between the transmitter 104 and the receiver 102 may include multiple reflectors (e.g., people or other objects) which cause signals at each antenna 120-126 to have various delays (i.e., a multipath propagation environment).

In accordance with another aspect of the present invention, the scanned antenna array is used to impart a phase onto a received signal to facilitate the use of Doppler direction finding techniques to determine the bearing of a received signal. Thus, by introducing the scanned antenna array into a wireless communication system to enhance anti-multipath impairment capabilities, it also becomes possible to determine the bearing of the received signal. As will be appreciated by those of ordinary skill in art, the Doppler direction finding techniques as described herein are not limited in application to a simulated mobile environment, and may be applied to any type of wireless communication system.

In accordance with the present invention, the bearing of a received signal is determined so that the antenna array may be operated as a phased array in a transmit mode with additional gain provided in the direction of the received signal, thereby improving signal return link performance while facilitating a reduction in overall power requirements. Since a signal may be transmitted in a directional manner to a remote receiver, the power of the signal in the direction of the receiver may be increased, with a corresponding reduction in power of signal components in other directions.

To determine the bearing of a received signal, the illustrated embodiment utilizes a so-called Doppler direction finding system which relies upon a scanned antenna array to phase modulate the received signal in a manner which enables detection of the signal's bearing.

Radio direction finding systems have long been used for the purpose of aircraft and sea vessel location. In automatic direction finding systems utilizing the Doppler frequency shift principle, a receiver antenna is generally circulated at a constant speed along a circular path. As the antenna approaches the source of the received signal, the apparent frequency of the received signal is increased. Conversely, when the receiver antenna moves away from the source of the received signal, the apparent frequency of the received signal is decreased. Where the frequency of the received signal is equal to the average frequency of the signal, the antenna is at its closest and farthest distances from the source of the received signal. By noting the position of the antenna as the frequency of the received signal crosses over from an above average frequency to a below average frequency, the bearing of the radio transmission can be determined. This determination can be made using simple, well-known circuitry or implemented in an algorithm in a digital signal processor.

Early disclosures of radio direction finding systems based on detection of the Doppler frequency shift principle are provided in U.S. Pat. Nos. 2,414,798 to H. T. Budenbom and 2,481,509 to Paul G. Hansel, each of which is incorporated herein by reference. These patents illustrate the use of a single dipole antenna rotated at a desired rate to phase modulate a received signal, and disclose the general structure of a receiver having the capability of determining, based on the phase imposed on the received signal, the bearing of the signal. The receiver 102 of the present embodiment incorporates similar structure for determining the bearing of a received signal.

Practical designs for Doppler automatic direction finding (DF) systems do not mechanically rotate a single antenna since the velocity required to place the Doppler component above the communication audio spectrum is quite large. Instead of mechanically rotating the antenna, practical systems utilize a circular fixed array of vertical antenna elements, such as the scanned antenna array disclosed in applicant's above-identified co-pending application. The Doppler modulation signal is provided by sequentially connecting the receiver to the successive antenna elements, generally by means of a switching or commutating device.

Figure 3:
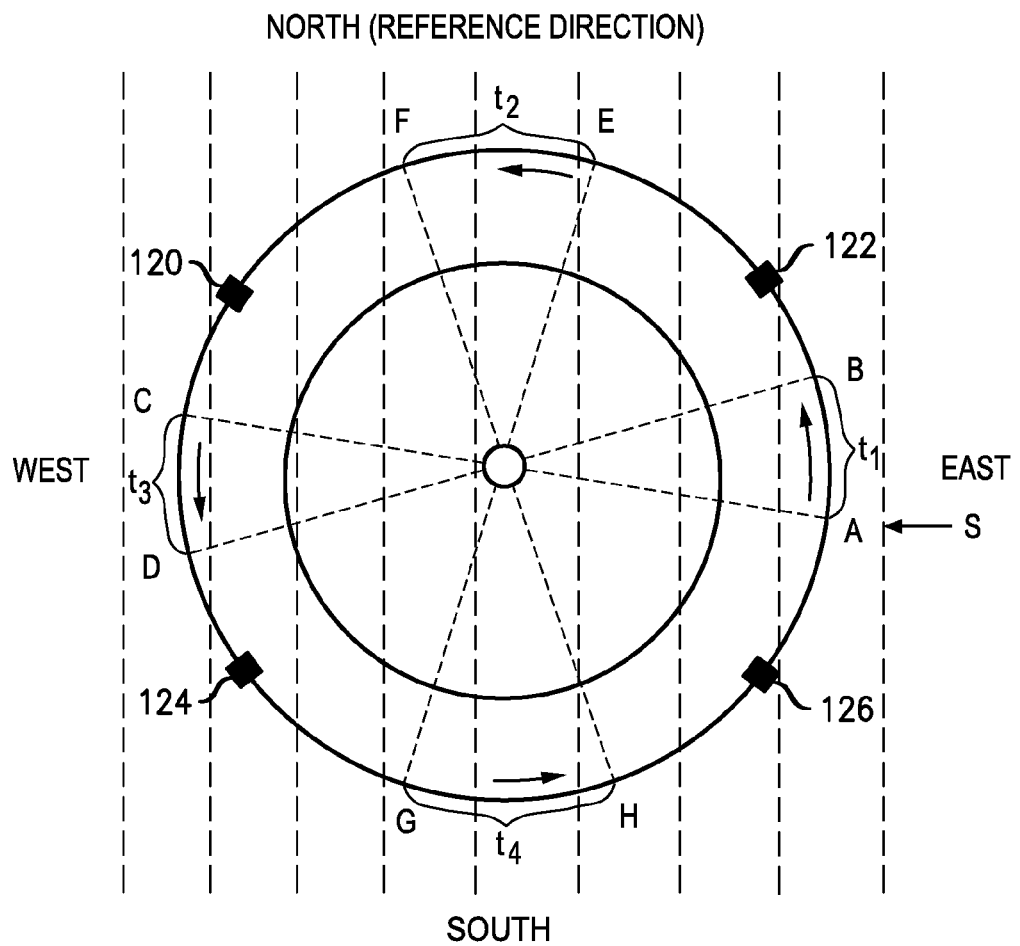
FIG. 3 is a diagram illustrating the Doppler frequency shift principle.

The Doppler frequency shift principle is illustrated graphically in FIG. 3. Assuming that arrow S represents the incoming horizontal direction of the wave and the broken parallel lines represent differently phased wave fronts. As the scanned antenna array 120-126 is operated by means of a commutation switch, it simulates travel by a single antenna along a circular path and traverses during each revolution a large number of wave fronts. During the time $t_1$ when the simulated rotating antenna (commuted antenna array 120-126) travels along the arc A-B, which is substantially perpendicular to the wave direction S, it intersects a minimum number of wave fronts. Similarly, during the time $t_3$ when it travels along the opposite arc C-D, $t_1$ being equal to $t_3$, it intersects a minimum number of wave fronts. Also during each of the time intervals $t_2$ and $t_4$, each of which is equal to $t_1$, the commuted antenna array effectively travels along the arcs E-F and G-H, respectively, and intersects a maximum number of wave fronts. Hence, the phase, and therefore the instantaneous carrier frequency of the voltage induced in the respective antennae, are increased a maximum amount during the period $t_4$ and decreased a maximum amount during the period $t_2$ if the antenna is moving counter-clockwise; whereas the phase remains substantially constant during the periods $t_1$ and $t_3$, whereby the phase and frequency of the antenna voltage are cyclically varied at a rate dependent upon the angular velocity of the antenna. More particularly, the ranges of phase change during periods $t_2$ and $t_4$ are equal but the changes are in different directions. Similarly, the changes in phase during the periods $t_1$ and $t_3$ are equal but of different direction. By detecting the phase or frequency imparted onto the received signal in the manner described above, the bearing of the received signal can be determined. The receiver 102 includes structure effective to determine the phase imparted on the received signal, and, in the manner described above, the bearing thereof. This may be accomplished by means well known in the art.

In order to accommodate a sufficient number of antenna elements needed to generate a suitably large phase modulation while at the same time keeping the incremental phase angle change occurring at the switchover between antennas small enough so as to reasonably approximate a continuously rotating single antenna element, the size of most conventional Doppler direction finding systems is rather large. Attempts to reduce the size of the antenna array generally decrease the magnitude of the phase modulation, and a reduction in the number of antenna elements in an array of a given size causes larger increments of phase to occur as adjacent elements are selected. Both of these factors decrease system accuracy. Also, discretely commuted Doppler radio direction finding systems generate RF transients at the receiver input which tend to momentarily overload the receiver causing sensitization, and the incremental phase modulation can result in false bearing being introduced from the modulation of off channel signals onto the selected frequency. U.S. Pat. No. 4,041,496 to Norris attempts to overcome these problems by connecting the outputs of four antennas through electronically variable series resistive elements into a common antenna output to the receiver. The antenna dimensions and series resistances are chosen in such a manner that a constant antenna output impedance is presented to the receiver, and the resulting RF output is phase modulated in a manner which approximates that which would be introduced by a single rotating element. U.S. Pat. No. 4,551,727 discloses a system which uses electronically controlled variable transconductance devices which provide RF output currents proportional to their respective RF input voltages.

The scanning antenna array 120-126 in this application is preferably similar to those which have historically been used in conventional Doppler-direction-finding (DF) systems, including those provided with the improvements pointed out above, to produce a scanned antenna array having an ideal number of antenna elements for a given application, with the scan control signals preferably, but not necessarily derived from the same clock(s) as the symbol rate, the reference oscillator for the system's frequency synthesizer, or some other convenient source. Both hard-switched and soft-switched systems, including make-before-break types of switching could be employed, subject to a determination of which approach represents the most optimum trade-off in any given system application with respect to cost, performance, etc. The number of antennae in the scanned array could also be varied in an effort to optimize the cost/performance trade-off in any given system application.

The antennae 120-126 are preferably arranged in a symmetrical pattern with sufficient spacing between the scanned elements in terms of wavelength at the desired frequency of operation. To enable Doppler direction finding, the antennae 120-126 are not arranged linearly, but are spread about equidistant from a common center point, e.g., about a circle or polygon, as shown in FIG. 3. Preferably, the antennae 120-126 are equidistant from one another about the circle. The radius of the circle is selected based upon the frequency of operation. The antennae should be spaced apart at least a significant portion of a wavelength. The array of antennae 120-126 are scanned by the scanner 100 such that when any one antenna 120-126 is active, that antenna provides a received signal to the receiver 102 as if it was the only antenna utilized by the receiver 102. When arranged in a circular pattern, i.e., each being equidistant from a common center point, the scanner 100 preferably scans each of the antennae 120-126 one at a time in a circular fashion, either clockwise or counter-clockwise about the circular pattern of antennae.

As described above, the antenna array 120-126 is operated during a transmit mode as a phased array with additional gain provided in the direction of the bearing of a received signal. Thus, after the bearing of a received signal is determined in the manner described above, the unit's transmitter 106 communicates with the remote unit in a directional manner. To accomplish this, the transmitter need not be modified and may comprise a suitable transmitter of conventional design. However, during a transmit mode, the antenna array 120-126 is not scanned as it is during a receive mode. Instead, the scanner 100 is operated in a transmit mode by a power divider and phase shifter(s) 100 to provide additional gain in the direction of the remote unit (as determined by the previously calculated bearing) and thus serves as a directional antenna during a transmit mode to increase the link performance between the transmitter and remote receiver.

Simulation of a mobile environment in the manner described above, together with the use of Doppler direction finding techniques prove to be of considerable benefit in stationary or quasi-stationary system applications, e.g., cordless telephone communications such as cordless telephones or cordless modems, wireless LAN products, wireless local loops, cellular and/or PCS telephones, trunked mobile radio systems, and/or mobile satellite communications systems. This is particularly true where the transmitters and/or receivers of the system are arbitrarily placed or moving slowly (e.g., at pedestrian speeds) through an environment including many sources of multipath reflections. Exemplary environments include residential, commercial, or industrial indoor environments, or even urban outdoor settings where building density provides many reflection paths.

The principles of the present invention are further applicable to more dynamic system applications such as cellular, PCS, mobile radio, and mobile satellite systems, where stationary or quasi-stationary elements of the system would benefit from a simulation of a more mobile environment using a scanned antenna array. Thus, with a receiver optimized for performance in a mobile environment, a mobile environment may be simulated by scanning through a plurality of receiver antennas to optimize the performance of the receiver in a stationary or quasi-stationary environment.

As will be appreciated by those of ordinary skill in the art, the scanned antenna array may be operated in alternative embodiments in a manner which allows it to simulate a highly directional antenna in both receive and transmit modes by focusing on signals having the correct bearing and attenuating or ignoring other signals in the same channel. Thus, for example, in an alternative embodiment, a mode of operation may be provided as follows: (1) initial detection of a received signal's bearing by operation in a scanned manner; (2) receipt of the signal with additional antenna gain provided in the calculated bearing by operation as a phased array; and (3) transmission of a signal to the remote unit by operation as a phased array.

In addition, the antenna array may be used to supplement rather than replace a conventional antenna system. By determination of the bearing of a received signal using the scanned antenna array, the conventional antenna system can be operated in a directional manner to communicate with one or more remote unit in a directional manner to improve signal link performance.

For instance, unlike the stationary environment described above, a base station antenna of a conventional cellular system typically accommodates multiple users for each of a plurality of individual channels. Thus, use of a single scanned antenna array to perform the above-described operation would necessitate a significant number of operational modes in which the antenna array would be scanned during reception of signals from each of plural mobile units, and operation as a phased array on transmit for each mobile unit. While such operation is technically possible, it is not ordinarily practical. In a mobile environment, one or more scanned antenna arrays can be provided to determine the bearing of plural incoming signals. Such antenna could be operated continuously in a scanned manner to track movement of the mobile units. Once the bearing of each signal is determined, the receiver of an antenna used by the base station could be operated to provide increased gain in the direction of the received signals. Operation of the antenna during the transmission of signals to the mobile units could be performed in the manner described above.

While the invention has been described with reference to the exemplary embodiments thereof, those skilled in the art will be able to make various modifications to the described embodiments of the invention without departing from the true spirit and scope of the invention.

What is claimed is:

1. A wireless communication system, comprising:
    a plurality of antennas, configured to operate as a phased array, for use by one receiver;
    a scanner adapted to scan through the plurality of antennas to at least substantially eliminate multipath nulls and provide a signal received from each of the plurality of antennas to the receiver and to impart Doppler modulation onto a received signal, wherein one or more of the received signals from the antennas are severely degraded; and
    a receiver having direction finding means for determining the bearing of a received signal in accordance with a phase thereof, said received signal containing additional gain,
    wherein said receiver is configured to eliminate multipath channel impairments caused at least by the severely degraded signals.

2. A wireless communication system according to claim 1; wherein a scan rate of the scanner for scanning each of the plurality of antennas is at least 100 hertz.

3. A wireless communication system according to claim 1; wherein a scan rate of the scanner for the plurality of antennas is at least 2000 hertz.

4. A wireless communication system according to claim 1; wherein the plurality of antennas are equidistant from a center point.

5. A wireless communication system according to claim 4; wherein the plurality of antennas are spaced equally apart around a circumference of a circle formed about said center point.

6. A wireless communication system according to claim 1; wherein the plurality of antennas comprises at least three antennae.

7. A wireless communication system according to claim 1; wherein the scanner continuously scans and connects each of the plurality of antennae in turn to the receiver for a substantially equal period of time.

8. A method for communication in a wireless communication environment, comprising:
    providing a common transceiver with a plurality of antennas configured to operate as a phased array;
    continuously scanning through the said plurality of antennas for a substantially fixed period of time by connecting each of the plurality of antennas to a receiver configured to at least substantially eliminate multipath nulls caused at least by severely degraded received signal samples in a substantially stationary wireless communication environment and to impart Doppler modulation onto a received signal;
    determining the bearing of the received signal in accordance with a phase thereof, said received signal containing additional gain; and
    operating the plurality of antennas as a phased array during a transmit mode.

9. A method for communication in a wireless communication environment according to claim 8; wherein the wireless communication environment comprises a quasi-stationary wireless communication environment.

10. A method for communication in a wireless communication environment according to claim 9; wherein the quasi-stationary wireless communication environment comprises a wireless local area network.

11. A method for communication in a wireless communication environment according to claim 9; wherein the quasi-stationary wireless communication environment is a cordless telephone.

12. A method for communication in a wireless communication environment according to claim 9; wherein the quasi-stationary wireless communication environment is a cordless modem.

13. A method for communication in a wireless communication environment according to claim 9; wherein the quasi-stationary wireless communication environment is a wireless local loop.

14. A method for communication in a wireless communication environment according to claim 9; wherein the quasi-stationary wireless communication environment is a cellular telephone.

15. A method for communication in a wireless communication environment according to claim 9; wherein the quasi-stationary wireless communication environment is a PCS telephone.

16. A method for communication in a wireless communication environment according to claim 9; wherein the quasi-stationary wireless communication environment is a trunked mobile radio system.

17. A method for communication in a wireless communication environment according to claim 9; wherein the quasi-stationary wireless communication environment is a mobile satellite communications system.

18. A method for communication in a wireless communication environment according to claim 8; wherein the step of continuously scanning connects each of the plurality of antennas to the receiver at least 100 times per second.

19. A method for communication in a wireless communication environment according to claim 8; wherein the step of continuously scanning connects each of the plurality of antennas to the receiver at least 2000 times per second.

20. A method for communication in a wireless communication environment according to claim 8; further comprising the step of locating each of the plurality of antennas substantially equidistant from a center point.

21. A method for communication in a wireless communication environment according to claim 20; wherein the plurality of antennas are spaced equally apart around a circumference of a circle formed about the center point.

* * * * *